United States Patent
Yamazaki et al.

4,052,123
Oct. 4, 1977

[54] CORRECTING LENSES UTILIZED IN THE MANUFACTURE OF FLUORESCENT SCREEN OF COLOR PICTURE TUBES

[75] Inventors: Eiichi Yamazaki, Ichihara; Toshio Ueda; Koichi Maruyama, both of Mobara, all of Japan

[73] Assignee: Hitachi, Ltd., Tokyo, Japan

[21] Appl. No.: 617,939

[22] Filed: Sept. 29, 1975

Related U.S. Application Data

[62] Division of Ser. No. 310,477, Nov. 29, 1972.

[30] Foreign Application Priority Data

Jan. 19, 1972 Japan .................................. 47-6963
Nov. 29, 1971 Japan .................................. 46-95333

[51] Int. Cl.² ............................................... G02B 3/02
[52] U.S. Cl. ................................. 350/189; 350/194; 350/211; 354/1
[58] Field of Search ............... 350/189, 193, 194, 211, 350/213; 354/1

[56] References Cited

U.S. PATENT DOCUMENTS

| 2,082,100 | 6/1937 | Dorey et al. | 350/211 |
| 2,999,126 | 9/1961 | Harries et al. | 350/189 |
| 3,177,397 | 4/1965 | Keeran | 350/211 |
| 3,628,850 | 12/1971 | Yamazaki et al. | 350/189 |

FOREIGN PATENT DOCUMENTS

| 1,663,875 | 9/1953 | Germany | 350/211 |

*Primary Examiner*—John K. Corbin
*Assistant Examiner*—Conrad Clark
*Attorney, Agent, or Firm*—Charles E. Pfund

[57] ABSTRACT

The correcting lens comprises a plurality of regions which are formed at at least one portions of the effective surfaces on both sides of the lens by means of a plurality of border lines which are discontinuous in only one direction. The regions on one side are inclined in a direction different from that of the regions on the opposite side of the lens.

7 Claims, 27 Drawing Figures

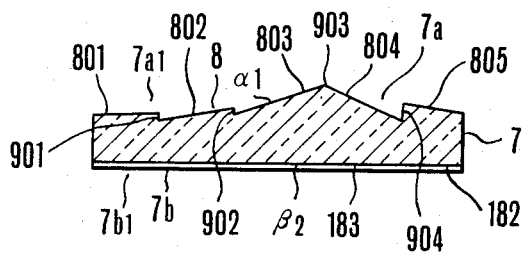
FIG. 6
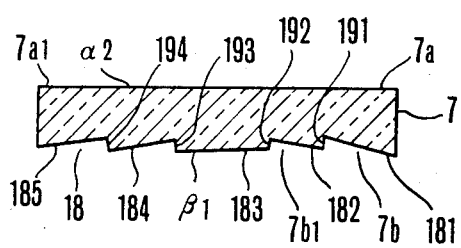
FIG. 7
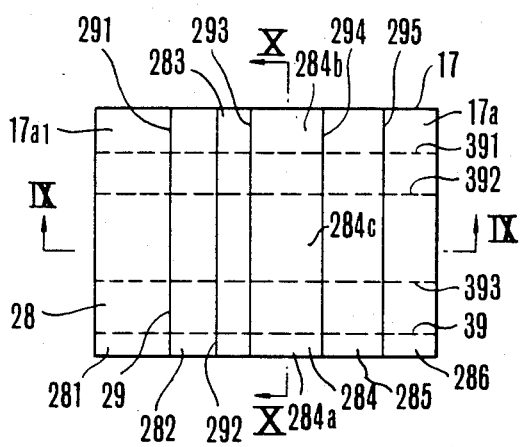
FIG. 8
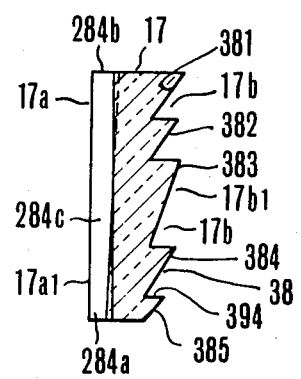
FIG. 10
FIG. 9

CORRECTING LENSES UTILIZED IN THE MANUFACTURE OF FLUORESCENT SCREEN OF COLOR PICTURE TUBES

This is a division, of application Ser. No. 310,477, filed Nov. 29, 1972.

BACKGROUND OF THE INVENTION

This invention relates to a correcting lens utilized to form a fluorescent screen of a colour picture tube and a method of manufacturing such a correcting lens and more particularly to a correcting lens wherein the effective surfaces on both sides of the lens are divided into a plurality of regions and a method of manufacturing such a correcting lens.

The fluorescent screen of a shadow mask type colour picture tube is generally formed by regularly coating phosphor dots of three colours by using photographic technique. In this case, for the purpose of forming the phosphor dots an exposure device as digrammatically shown in FIG. 1 is used. The exposure device 1 shown in FIG. 1 comprises a light source 2, and a correcting lens 3 for causing the light beam emanated from the light source to approximate the actual locus of the electron beam and the coating of the phosphors applied on the inner surface of the panel 5 of a colour picture tube is exposed to the light beam emanated by the light source 2 through the correcting lens 3 and a shadow mask 4 supported in front of the phosphor coating. Such an exposure device has been used not only to form phosphor dots but also to form so-called matrix holes which are used to form the phosphor dots of a black matrix type colour picture tube. The novel correcting lens can be used in the manufacture of these two types of fluorescent screens.

The surface of the prior art correcting lens utilized in such an exposure device includes extremely complicated curved surfaces for the purpose of causing the light beam to substantially approximate the locus of the electron beam. Continuously curved surfaces are generally used, but with this construction it has been impossible to cause the exposure light to approximate the locus of the actual electron beam beyond a certain limit. For this reason, it has been impossible to perfectly aligne the phosphor dots and the electron beam spots over the entire area of the panel. Accordingly, in the colour picture tube having a fluorescent screen formed by using such a correcting lens with continuous curved surfaces it is inevitable to form a colour shading thus imparing the picture quality.

To obviate these difficulties it has been proposed a correcting lens as shown in FIGS. 2 and 3 wherein the effective area $6a1$ of one side $6a$ of the lens is divided into a plurality of plane or curved regions $601, 602, \ldots, 6nn$ by means of discontinuous border lines $6x1 - 6xn$ and $6y1 - 6yn$. The effective are $6b1$ of the opposite side $6b$ is plane.

When compared with correcting lenses having continuous curved surfaces or having stepped discontinuous portions in the radial direction on one side, the correcting lens shown in FIGS. 2 and 3 can more accurately coinsides the exposure light beam and the locus of the actual electron beam but due to the discontinuous border lines $6x1 - 6xn$ and $6y1 - 6y2$ between respective regions $601, 602, \ldots, 6nn$ a grid shaped nonuniform exposure pattern is formed. Accordingly, a fluorescent screen 5 formed by using such a correcting lens 6 has a nonuniform appearance as at $5a$ as shown in FIG. 5 even when the fluorescent screen is not in operation. When the areas of the divided regions of the correcting lens are small the effect of such a nonuniform appearance is not significant, but it is difficult to decrease the areas beyond a predetermined limit for various reasons. Furthermore, when the number of the divided regions increases to 100 or several hundreds, it is necessary to use a number of process steps thus increasing the cost of manufacturing.

Even when a lens having discontinuous surfaces is combined with a lens having continuously curved surfaces it has been impossible to completely solve the problem of nonuniform appearance.

SUMMARY OF THE INVENTION

Accordingly, it is an object of this invention to provide correcting lens for use in the manufacture of a fluorescent screen of a colour picture tube in which a plurality of relatively large regions are formed on both sides of the lens whereby the lens can manifest excellent correcting effect as if it were provided with a plurality of small regions on one side.

A further object of this invention is to provide an improved correcting lens wherein the difference in the height of the discontinuous border lines between a plurality of regions is decreased equivalently thereby eliminating undesirable non-uniform appearance of the resulting fluorescent screen.

Still further object of this invention is to provide a correcting lens which can be more readily manufactured than the prior art correcting lens.

Another object of this invention is to provide a novel method of manufacturing a correcting lens for use in the manufacture of a fluorescent screen of a colour picture tube which can reduce the number of process steps of manufacturing a metal mould utilized to mould the lens thereby reducing the cost of manufacturing the correcting lens.

According to one aspect of the invention there is provided a correcting lens of an exposure device utilized to form a fluorescent screen of a colour picture tube, characterized in that a plurality of regions are formed at at least one portions of the effective surfaces on both sides of the lens by means of a plurality of border lines which are discontinuous in only one direction and that the regions on one side are inclined in a direction substantially different from that of the regions on the other side of the correcting lens.

According to another aspect of this invention there is provided a correcting lens of an exposure device utilized to form a fluorescent screen of a colour picture tube, characterized in that the correcting lens is provided with a plurality of regions at at least one portion of the effective surface on one side of the correcting lens which are devided by a plurality of concentric border lines which are discontinuous in the radial direction, the regions having inclined surfaces, and a plurality of regions on the opposite side of the correcting lens which are divided by a plurality of border lines which are discontinuous in only one direction, the second mentioned regions having inclined surfaces.

According to still another aspect of this invention, there is provided a method of manufacturing a correcting lens of an exposure device utilized to form a fluorescent screen of a colour picture tube, characterized by the steps of forming a mother mould having a contour corresponding to a plurality of regions to be formed on one side of the correcting lens, forming a mould by using the mother mould and press moulding a blank of the correcting lens with the mould thereby obtaining the correcting lens.

BRIEF DESCRIPTION OF THE DRAWINGS

Further objects and advantages of the invention can be more fully understood from the following detailed description taken in conjunction with the accompanying drawings in which:

FIG. 6 shows a sectional view of the correcting lens shown in FIG. 5A taken along a line VI—VI;

FIG. 7 shows a sectional view of the correcting lens shown in FIG. 5A taken along a line VII—VII;

FIG. 8 shows a plan view of a modified correcting lens of this invention;

FIG. 9 is a sectional view of the correcting lens shown in FIG. 8 taken along a line IX—IX;

FIG. 10 shows a sectional view of the correcting lens shown in FIG. 8 taken along a line X—X;

DESCRIPTION OF THE PREFERRED EMBODIMENTS

Figure 5A:
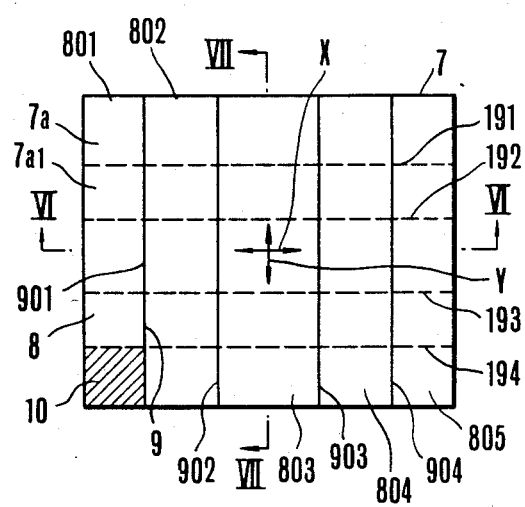
FIG. 5A is a plan view of one example of the novel correcting lens constructed in accordance with the invention.
Figure 5B:
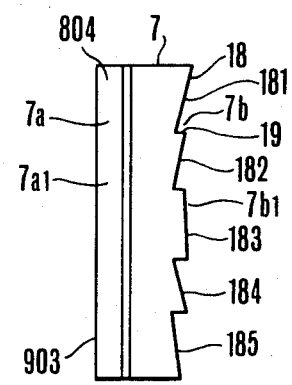
FIG. 5B is a side view of the correcting lens shown in FIG. 5A.

Referring now to FIGS. 5 to 7 of the accompanying drawing, the effective area $7a1$ of one side $7a$ of a correcting lens 7 embodying the invention is divided into a plurality of regions 8 (namely, 801–805) by means of discontinuous border lines 9 (namely, 901–904). The respective regions 8 are inclined only in the direction of X-axis, that is in the horizontal direction to define predetermined planes or curved surfaces. Similarly, the effective area $7b1$ of the opposite side $7b$ is also divided into a plurality of discrete regions 18 (181–185) by means of a discontinuous border lines 19 (191–194) and these regions 18 are inclined only in the direction of Y-axis, that is in the vertical direction so as to define predetermined planes or curved surfaces or a combination thereof. Regions 8 are continuous in the direction of Y-axis, whereas regions 18 are continuous in the direction of X-axis. Accordingly, when light is projected upon one side of the correcting lens 7, it forms a total of 25 blocks 10 by the combination of five regions 801 to 805 on one side $7a$ and five regions 181 through 185 on the other side $7b$. One of the blocks 10 is shown shaded. More particularly, considering one side $7a$, region 803 is interposed between regions 802 and 804 in the X-axis direction as viewed in FIG. 5, and discontinuous border lines 902 and 903 are formed between these adjacent regions. In other words, the region 803 is discontinuous in the X-axis direction but continuous in the Y-axis direction. As best shown in FIG. 6, the region 803 is inclined downwardly to the left of the border line 903 which is discontinuous in the direction of X-axis at an angle $\alpha_1$ but is not inclined in the direction of Y-axis (or $\alpha_2 = 0$). The region 183 on the other side $7b$ is interposed between regions 182 and 184 and border lines 192 and 193 which are discontinuous in the Y-axis direction, or in the direction perpendicular to the discontinuous border line 9 between respective regions 8 on the side $7a$ are interposed between regions 182, 183 and 184. As shown in FIG. 6, the region 183 is continuous in the X-axis direction. Further, as shown in FIGS. 6 and 7, the region 183 is inclined downwardly to the left at an angle $\beta_1$ from the border line 192 which is discontinuous in the Y-axis direction but not inclined in the direction of X-axis (or $\beta_2 = 0$).

In the modified embodiment shown in FIGS. 8, 9 and 10, the correcting lens 17 shown therein is formed with a plurality of regions 28 (281 through 286) and 38 (381 through 385) and discontinuous border lines 29 (291 through 295) and 39 (391 through 394) in the effective areas $17a1$ and $17b1$ on both sides $17a$ and $17b$ thereof. Regions 281 through 286 on one side $17a$ extend in the same direction, that is in the X-axis direction and are inclined downwardly from right to left. Similarly, the regions 281 through 385 on the other side $17b$ are inclined in the opposite direction to that of the regions 281 through 286 on the side $17a$, that is inclined downwardly from left to right. In this embodiment, region 284 is inclined in the X-axis direction and one side of its lower end $284a$ is viewed in FIG. 8 which is adjacent the region 283 is higher than the other side which is adjacent to region 285 whereas one side of the upper end $284b$ of the region 284 which is adjacent to region 285 is higher than the other side adjacent the region 283 but the central portion of region 284 is substantially parallel with the upper and lower edges. In other words, the region takes a form of a propeller.

Figure 11:
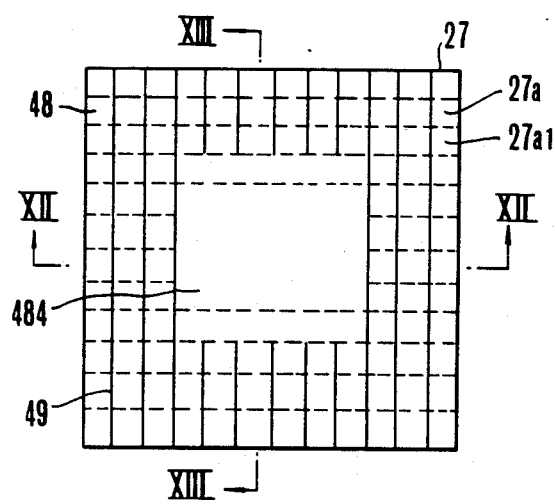
FIG. 11 shows a plan view of another embodiment of this invention.
Figure 13:
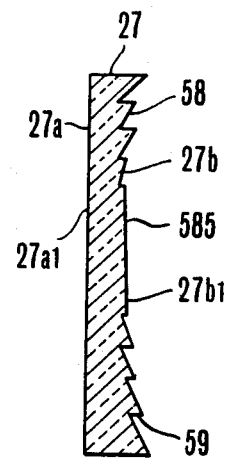
FIG. 13 shows another sectional view of the correcting ing lens shown in FIG. 11 taken along a line XIII—XIII.
Figure 12:
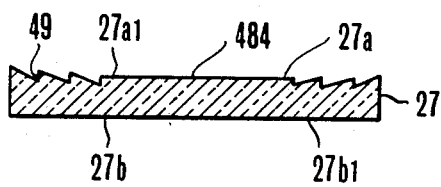
FIG. 12 shows a sectional view of the correcting lens shown in FIG. 11 taken along a line XII—XII.

Modified correcting lens 27 shown in FIGS. 11, 12 and 13 is provided with a flat or not inclined region 484 at the central portion of the effective area 27a1 of one side 27a and a similar not inclined region 585 at the central portion of the effective area 27b1 on the other side 27b. As is clearly shown in these figures, regions 484 and 585 have different areas. One side 47a are provided with a plurality of regions 48 and the other side 27b are also provided with a plurality of regions 58 which are divided by discontinuous border lines 49 and 50, respectively. In this embodiment regions 484 and 585 are flat or not inclined whereas other regions 48 and 58 on the side opposite to these regions 484 and 585 are inclined in the opposite direction.

Figure 14:
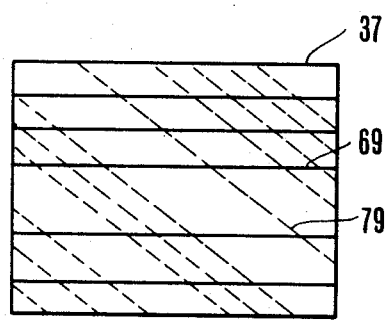
FIGS. 14 and 15 are plan views of further modifications of this invention.

In another correcting lens 37, shown in FIG. 14, the discontinuous border lines 69 and 79 on the opposite sides do not intersect with each other at right angles.

Figure 15:
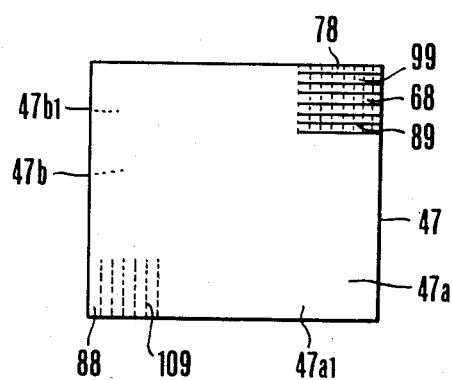

In still another modification shown in FIG. 15, a portion of the effective area 47a1 on one side of the correcting lens 47a is divided into a plurality of parallel regions. A portion of the effective area 47a1 on the other side 47b which corresponds to the divided regions 68 is divided into a plurality of regions 78 and a portion of that effective area 471 diagonally opposite to the divided regions 78 is divided into a plurality of regions 88. These regions 68, 78 and 88 are divided by border lines 89, 99 and 109, respectively, which are discontinuous in only one direction. Regions 68 on one side 47a and regions 78 and 88 on the other side are inclined in the opposite directions. The remaining portions of the effective areas 47a1 and 47b1 which are not divided as above described are flat or not inclined.

Although in the foregoing description, respective regions have been shown as being inclined in the direction perpendicular to the longer sides of respective regions it should be understood that these regions may be inclined in any desired direction. Further, it should also be understood that the configuration of the correcting lens is not limited to rectangular.

Figure 16:
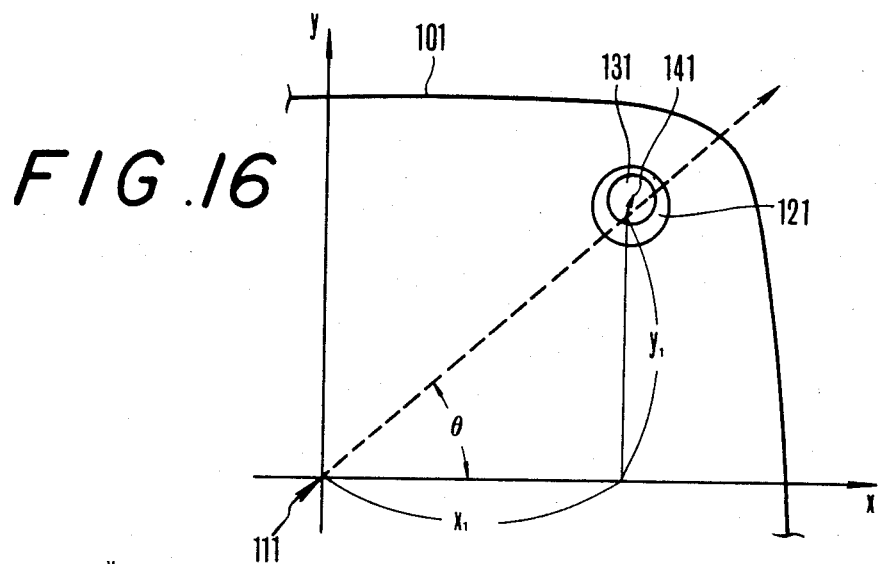
FIG. 16 is a diagram to explain the relationship between a phosphor dot and an electron beam spot on a fluorescent screen to explain still another embodiment of this invention.
Figure 17:
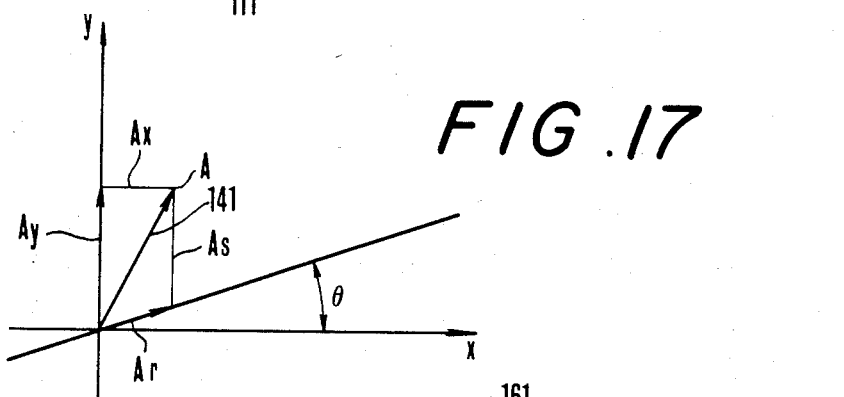
FIG. 17 is an enlarged view to show the detail of the misalignment shown in FIG. 16.

FIG. 16 shows, in a magnified scale, the manner of aligning a phosphor dot and an electron beam spot, that is the manner of landing of the electron beam during the operation of a colour picture tube. Considering the relationship between a phosphor dot 121 and an electron beam spot 131 at a position $(x1, y1)$ expressed by a rectangular coordinates X-Y having its origin at the center 111 of the effective area 101 of the fluorescent screen there is a deviation 1A1 between them which is expressed by 1A in terms of the vector quantity. The correcting lens is used to minimize or reduce to zero this deviation over the entire area of the fluorescent screen. Expressing the components in the X and Y directions of the deviation 1A at any point $(x, y)$ on the fluorescent screen by $Ax$ and $Ay$, respectively, as shown in FIG. 17, it is possible to express these components as the functions of the position $(x, y)$ according to the following equations.

$$Ax = \sum_{m=0}^{\infty} \sum_{n=0}^{\infty} C_{1mn} x^m y^n \quad (1)$$

$$Ay = \sum_{m=0}^{\infty} \sum_{n=0}^{\infty} C_{2mn} x^m y^n \quad (2)$$

where $C_{1mn}$ and $C_{2mn}$ represent coefficients, $m$ and $n$ are equal to 0, 1, 2, . . . , respectively. Where the deviation 1A is decomposed into a radial component $Ar$ passing through the origin and a component $As$ in the direction of S, the radial component $Ar$ is shown by an angle $\theta$ measured from the abscissa and the S component may be selected arbitrary. In this example, the direction S is selected to be parallel with the ordinate. Accordingly, the components $Ar$ and $As$ shown in FIG. 17 can be expressed by $$Ar = Ax \sec\theta \quad (3)$$

$$As = Ay - Ax \tan\theta \quad (4)$$

where $\theta$ varies from 0° to 360°.

Figure 18:
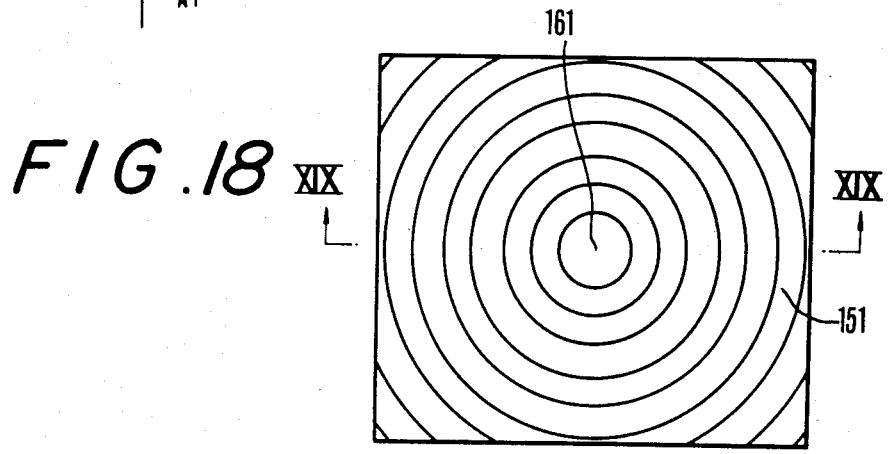
FIG. 18 shows a plan view of another embodiment of this invention formed with a plurality of concentric border lines on one side.
Figure 19:
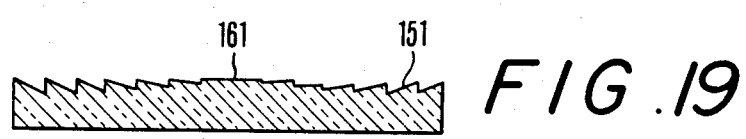
FIG. 19 is a sectional view of the correcting lens shown in FIG. 18 taken along a line XIX—XIX.

A discontinuously curved surface that satisfies equation 3 is the one that includes border lines which are discontinuous in the radial direction as shown by the plan view of FIG. 18 and the sectional view of FIG. 19. The direction of inclination of respective regions bounded by these discontinuous border lines is in the radical direction. Since the magnetic field distribution of a deflection coil which causes such deviation is generally symmetrical the difference between the inclination angles of respective annular regions is very small or nearly equal to zero the inclination at the central portion 161 of a correcting lens having discontinuously curved surfaces is nearly zero.

For this reason, above described correcting lens having the characteristics described above may be considered as a modification of the Fresnel's lens which is used widely as an optical lens and since such correcting lens has circular border lines it is possible to readily manufacture it by a lath.

Figure 20:
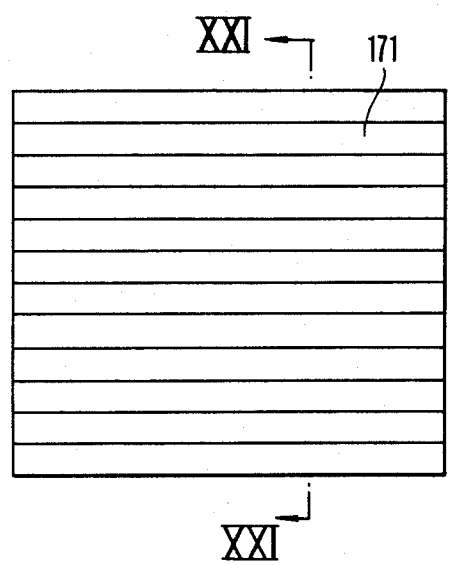
FIG. 20 is a plan view of the opposite side of the correcting lens shown in FIG. 18.
Figure 21:
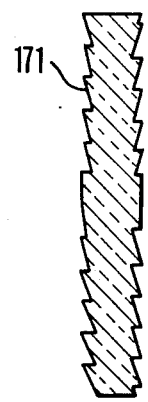
FIG. 21 shows a sectional view of the correcting lens shown in FIG. 20 taken along a line XXI—XXI.

Considering now the discontinuously curved surfaces that satisfy equation 4, such surfaces may be shown by the plan view shown in FIG. 20 and the sectional view shown in FIG. 21 and having border lines which are discontinuous only in the direction of X. All regions 171 divided by these discontinuous border lines incline in the direction of Y.

Figure 2:
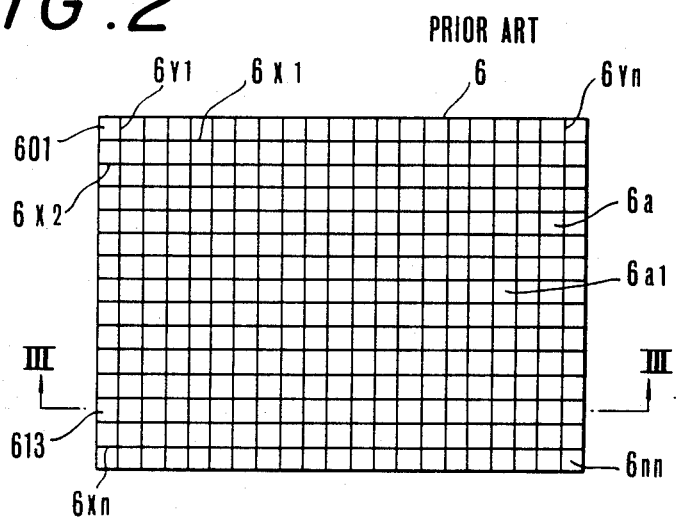
FIG. 2 is a plan view of one example of a conventional correcting lens.
Figure 3:
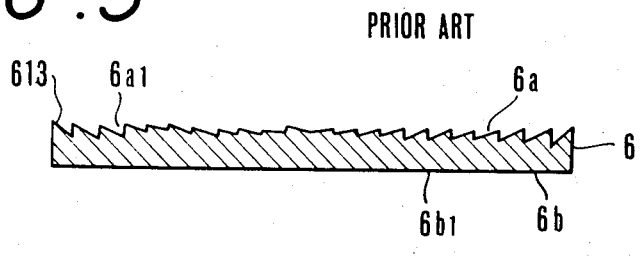
FIG. 3 shows a sectional view of the lens shown in FIG. 2 taken along a line III—III.
Figure 4:
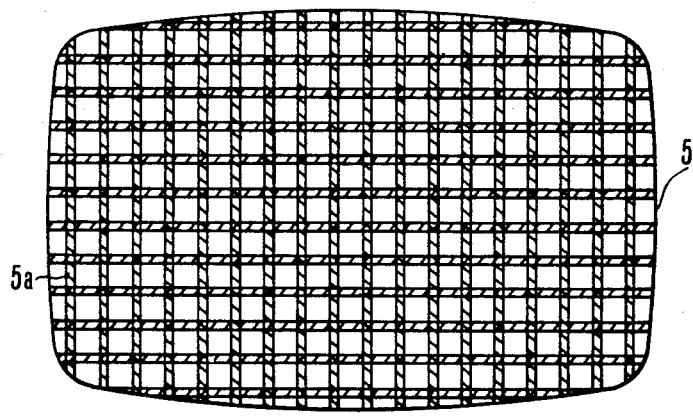
FIG. 4 is a plan view of a panel formed by using the correcting lens shown in FIGS. 2 and 3 and having nonuniform appearance.
Figure 22:
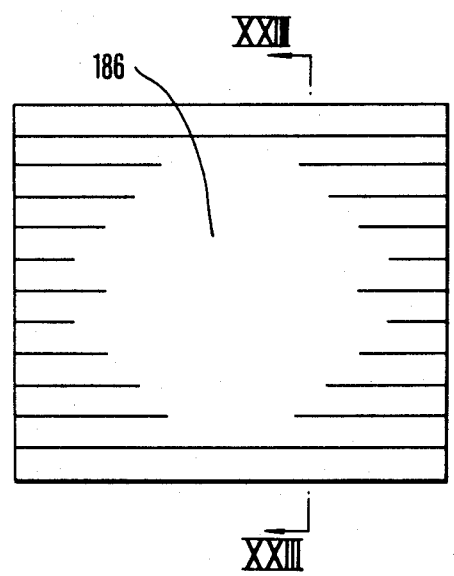
FIG. 22 shows a plan view of one side of another embodiment of this invention.
Figure 23:
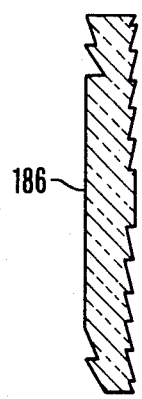
FIG. 23 is a sectional view of the correcting lens shown in FIG. 22 taken along a line XXIII—XXIII.

For this reason, a correcting lens which is formed on one side with concentric annular curved surfaces which are divided by border lines that are discontinuous in the radial direction and on the other side with curved surfaces that are divided by border lines which are discontinuous in only one desired direction, can operate just in the same manner as that shown in FIG. 2. Where two curved surfaces are combined in this manner, it is possible to decrease the number of regions divided by the discontinuous border lines than the conventional compensating lens shown in FIG. 2, thereby decreasing the process steps required to manufacture the metal mould utilized to fabricate the correcting lens. It should be understood that the curved regions may be inclined in the plus and minus directions along both the ordinate and abscissa and that the angle of inclination may include plus and minus quantities as well as zero along the axis perpendicular to the X and Y-axes, that is the Z-axis. Accordingly, a considerably wide area at the central portion of the effective area of the correcting lens may be made flat or not inclined as shown in FIGS. 22 and 23.

Although this embodiment has been described in terms of a sheet of synthetic resin or glass formed with curved surfaces divided by concentric border lines or surfaces on one side and curved surfaces divided by the border lines or surfaces on the other side, it should be understood that the invention is not limited to this particular construction and that a single composite correcting lens may also comprise a combination of a first correcting lens provided with curved surfaces divided by concentric border lines on one side and a second correcting lens provided with curved surfaces divided by border lines or surfaces on the other side.

Figure 24:
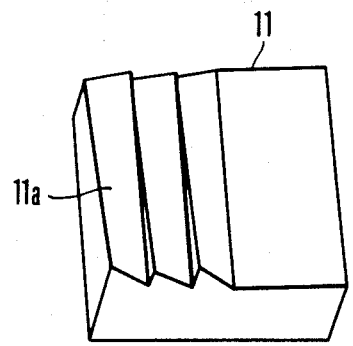
FIG. 24 is a perspective view of a mould utilized to form the correcting lens of this invention.
Figure 25:
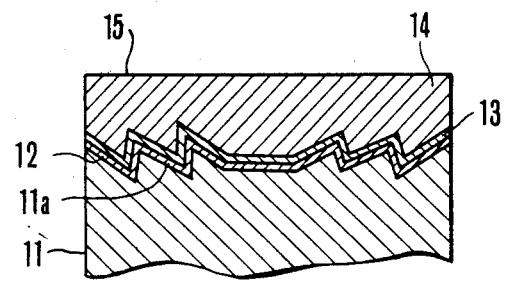
FIG. 25 is a sectional view to explain one method of manufacturing a mould utilized to form the correcting lens of this invention.

A typical method of manufacturing the novel correcting lens is as follows. As shown in FIG. 24, the upper surface 11a of a mother mould 11 is shaped to have a configuration corresponding to predetermined planes or curved surfaces of the effective are of one side of a correcting lens to be manufactured. It is desirable to made the mother mould of such material as a lacquer plate that can be readily cut and ground to have a configuration corresponding to respective regions. The surface of the mother plate is then made conductive by applying a smooth metal film 12, as shown in FIG. 25 which may be formed by plating silver or by a silver mirror forming reaction, or by vapour depositing aluminum. Nickel is plated on the conductive film 12 to form an intermediate layer 13. Any metals other than nickel which do not rust can be used to form the intermediate layer 13. A base layer of copper or nickel 14 is cast on the intermediate layer 13.

Figure 26:
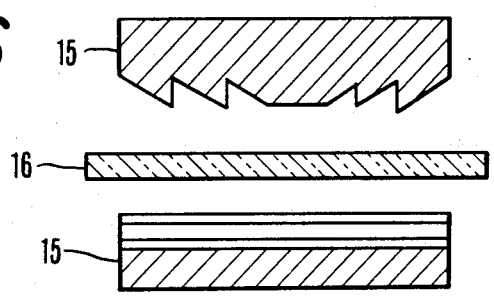
FIG. 26 is a sectional view to explain the novel method of manufacturing the correcting lens.

Then, layers 12, 13 and 14 are separated from the mother mould 11 to complete a mould 15. Where the intermediate layer 13 and the base layer 14 are made of the same material, these layers are bounded integrally. The base 14 is required to have sufficient strength and hardness necessary to act as a backing member when the mould 15 is used as a press mould. Alternatively, a suitable mould releasing such as a silicone oil is applied on the surface of the film 12 applied on the mother mould and then copper or nickel is cast on the coated film 12. The casting is removed from the mould. The separated casting is used to form a second mother mould of lacquer plate similar to the mother mould 11. The second mother mould is coated with a mould release, electroplated with nickel and finally cast with copper or nickel block, thus forming another mould for preparing the correcting lenses of this invention. The other mould for moulding the effective surface of the other side of the correcting lens is prepared by the same method. A sheet of blank 16 made of a synthetic resin such as acrylic resin is preheated to about 70° C, for example, and is then press moulded by using a pair of moulds prepared by the method described above as shown in FIG. 26. The moulded lens is then ground to form a compensating lens as shown in FIGS. 5 through 15 or FIGS. 18 through 23. It is also possible to use a semiliquid type synthetic liquid as the raw material. Further, any transparent mouldable substance can be used so long as it does not form any air bubbles or other type defects in the completed lens. Instead of using a pair of moulds, two sheets of lens material, each moulded with a plurality of regions may be bonded together to form a composite correcting lens.

As above described, since in accordance with this invention, each one of the opposite side surfaces of a correcting lens is divided into a plurality of regions, even when the areas of respective regions are made larger than those of a prior art compensating lens wherein only one side surface is divided into a plurality of regions, it is possible to substantially reduce the area of the blocks formed by the cooperation of the corresponding regions on both sides of the lens. Accordingly, it is possible to reduce the difference in the height of the discontinuous border lines thereby decreasing non-uniform appearance of a colour picture tube manufactured by using the correcting lens embodying the invention. Further, as the respective regions are defined by border lines or surfaces which are discontinuous in only one direction it is possible to cut or grind continuously the respective regions of the lens blank of glass or plastic, thus decreasing the process steps and cost of manufacturing the correcting lens.

In the correcting lens wherein the discontinuous border lines on the opposite sides intersect with each other at right angles, it is possible to decrease the areas of the resulting blocks. Moreover, in a correcting lens wherein respective regions incline substantially in the same direction, the manufacturing steps of the mould is greatly simplified.

Figure 1:
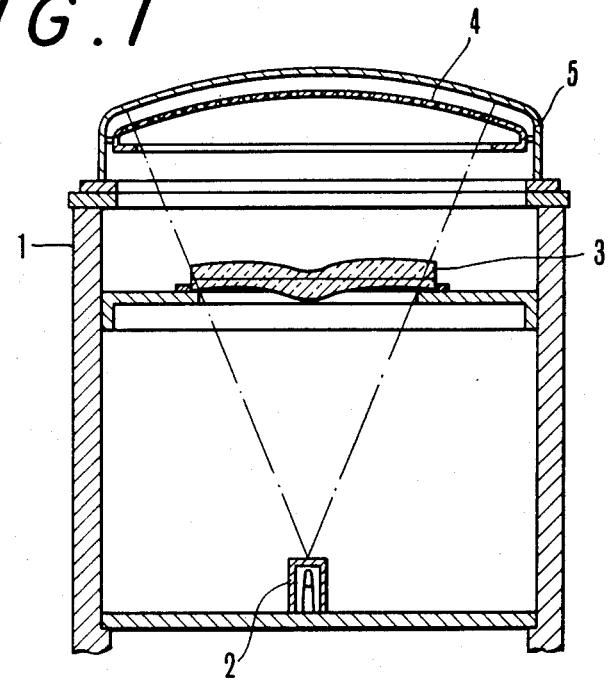
FIG. 1 shows a diagrammatic sectional view of an exposure device utilized in the manufacture of a fluorescent screen of a colour picture tube.

By differing the directions of inclinations of the regions on the opposite sides, the process of manufacturing the correcting lens can be greatly simplified when compared with the correcting lens of the prior construction and yet it is possible to obtain a correcting lens having a comparable correcting ability as that shown in FIGS. 1 and 2, thereby assuring perfect alignment of the phosphor dots and the electron beam spots over the entire surface of the fluorescent screen. Consequently, it is possible to solve the problem of the colour shading of a colour picture tube.

What is claimed is:

1. A correcting lens of an exposure device utilized to form a fluorescent screen of a colour picture tube, the correcting lens having effective surfaces on opposite sides thereof, each effective surface comprising a plurality of regions divided by a plurality of border lines and each having a specified refractive characteristic to exposure light, said border lines on the respective sides dividing one effective surface of the correcting lens in a direction different from another direction in which the opposite effective surface of the correcting lens is divided, and being discontinuous in only one direction, the regions on said opposite sides being inclined in substantially different directions to provide said specified refractive characteristic such that the exposure light path through the correcting lens approximates the ultimate electron beam locus by cooperation of the regions on one side of the correcting lens with those on the opposite side thereof, and wherein said correcting lens comprises a plurality of regions, at least one portion of the effective surface on one side of said correcting lens having a plurality of concentric border lines which are discontinuous in the radial direction for dividing said regions.

2. The correcting lens according to claim 1 wherein the surfaces of the regions on both sides are flat.

3. The correcting lens according to claim 1 wherein the surfaces of the regions on both sides of the correcting lens are curved.

4. The correcting lens according to claim 1 wherein said border lines which are discontinuous in only one direction are parallel with each other.

5. The correcting lens according to claim 1 wherein the regions divided by said discontinuous border lines are inclined substantially in the same direction.

6. A correcting lens for use in the formation of a colour picture tube screen including,
a first effective surface comprising a plurality of parallel stripe-shaped elements separated by boundaries of discontinuity, each of said elements separately contoured to reduce a misregister in said tube, and second effective surface opposite said first effective surface, said second effective surface comprising a plurality of elements separated by boundaries of discontinuity, each of said elements of said second effective surface separately contoured to additionally reduce misregister in said tube wherein said second effective surface comprises concentric annular ring-shaped elements.

7. A correcting lens for use in the formation of a colour picture tube screen comprising,
two effective surfaces on opposite sides of said lens, each surface comprising a plurality of elements separated by boundaries of discontinuity, one of said surfaces having concentric circular boundaries of discontinuity and elements on opposite sides of said lens contoured to cooperatively reduce misregister in said tube.